United States Patent [19]

Musil et al.

[11] Patent Number: 5,467,867

[45] Date of Patent: * Nov. 21, 1995

[54] SPLICE ASSEMBLIES FOR CONNECTING BELT ENDS

[75] Inventors: Edward C. Musil; William J. Daniels, both of Orland Park, Ill.

[73] Assignee: Flexible Steel Lacing Company, Downers Grove, Ill.

[ * ] Notice: The portion of the term of this patent subsequent to Sep. 20, 2004, has been disclaimed.

[21] Appl. No.: 230,540

[22] Filed: Apr. 20, 1994

Related U.S. Application Data

[63] Continuation-in-part of Ser. No. 61,163, May 13, 1993, Pat. No. 5,348,143.

[51] Int. Cl.$^6$ ................................................ B65G 15/30
[52] U.S. Cl. .......................... 198/844.2; 24/33 P
[58] Field of Search ................... 198/844.2; 474/253, 474/255, 257; 24/33 F, 33 P, 33 M, 31 B

[56] References Cited

U.S. PATENT DOCUMENTS

| | | | |
|---|---|---|---|
| 3,084,408 | 4/1963 | Ireland | 24/33 |
| 4,212,094 | 7/1980 | Pray | 24/31 B |
| 4,625,369 | 12/1986 | Musil | 24/33 B |
| 5,099,548 | 3/1992 | Loosli | 24/38 |

*Primary Examiner*—James R. Bidwell
*Attorney, Agent, or Firm*—Fitch, Even, Tabin & Flannery

[57] ABSTRACT

A splice assembly is provided for connecting together a pair of belt ends by splice members having elongated tensile members such as cables or straps in a manner which allows for troughing of the belt across its width at the connected belt ends. End members are fastened to the ends of the cables or belts and the belt fasteners have slots or apertures for engageably receiving the ends members of the cables or straps, whereby the cables or straps are affixed to both of the first and second belt ends to be joined along the width of the belt ends. There is a small gap between adjacent belt fasteners which allows for flexion of the belt to allow for the aforementioned troughing of the belt. The belt splice may be provided with a support slab, which protects the cables or belts against abrasion or being snagged and which also maintains a plurality of cables or straps in spaced, generally parallel relation. The opposite ends of the support slab, from which the ends of the cables or straps protrude, are preferably curved inwardly to accommodate the leading end of the belt fasteners to shield this region from particulate sifting. The belt splices extend in a transverse direction to positions closely adjacent one another to reduce sifting of material through spaces between adjacent belt fasteners.

20 Claims, 13 Drawing Sheets

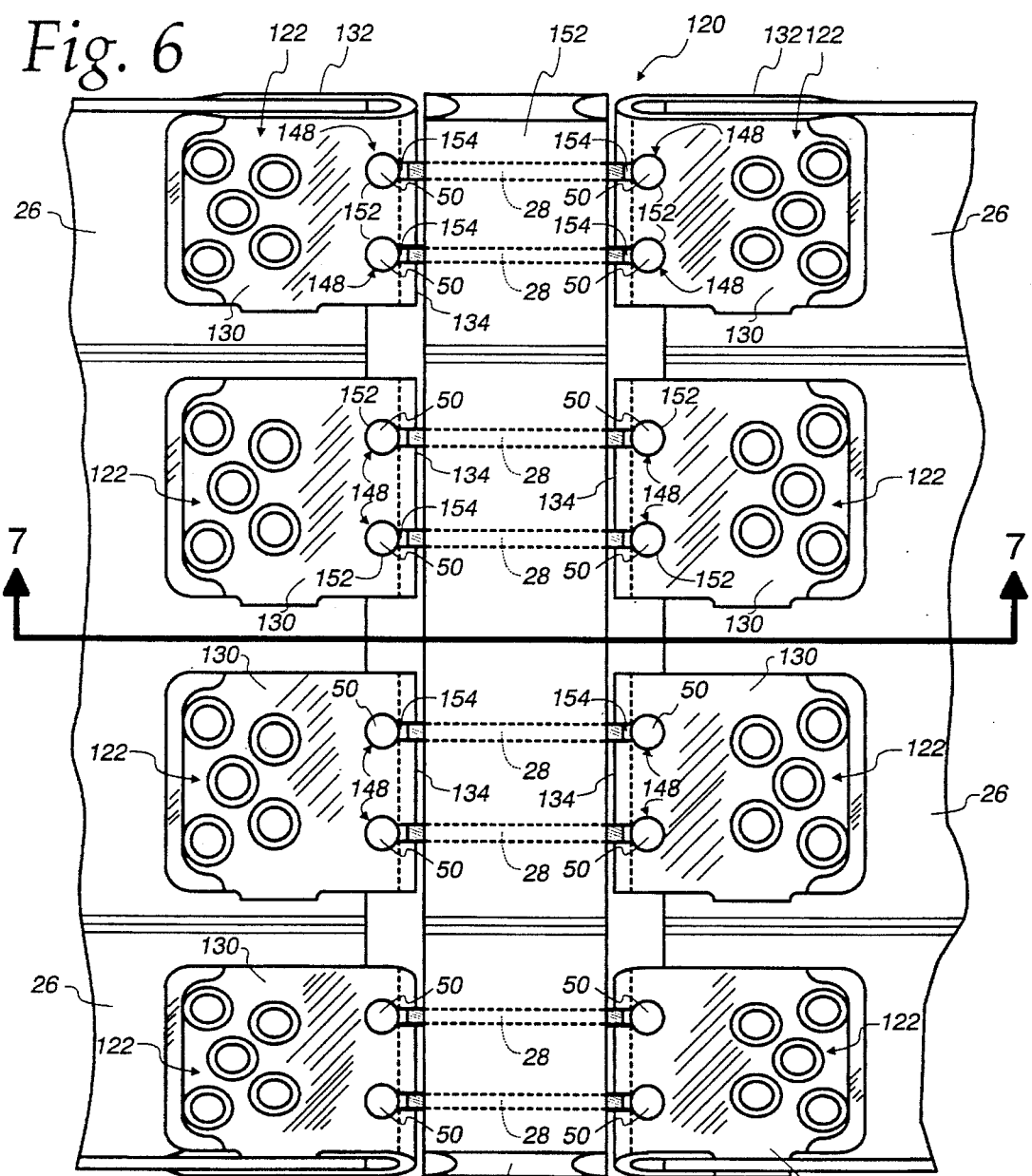
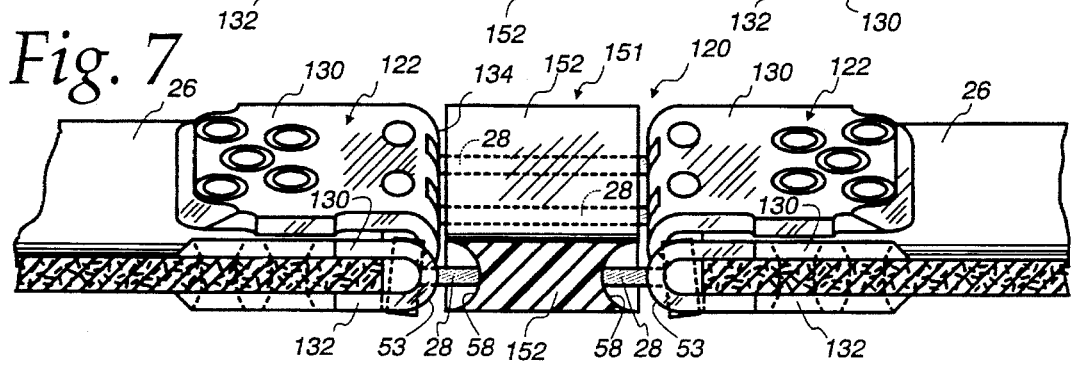

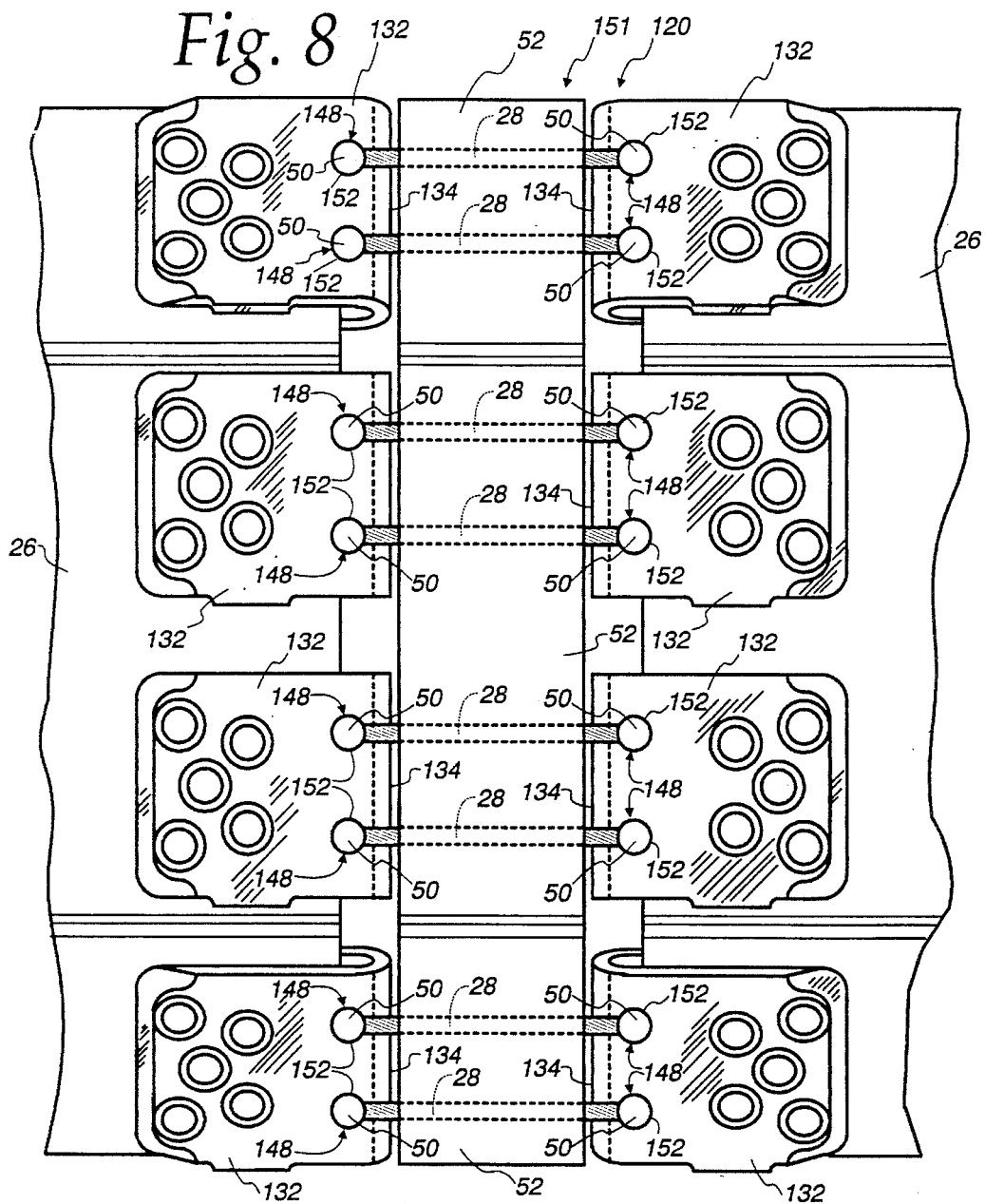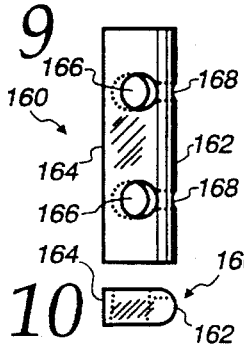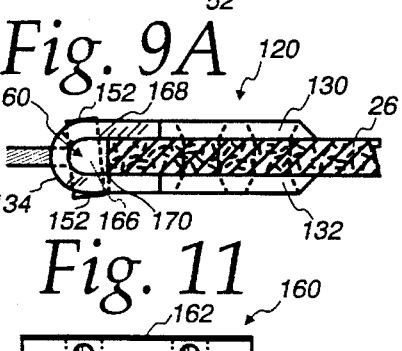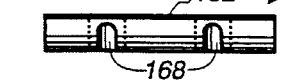

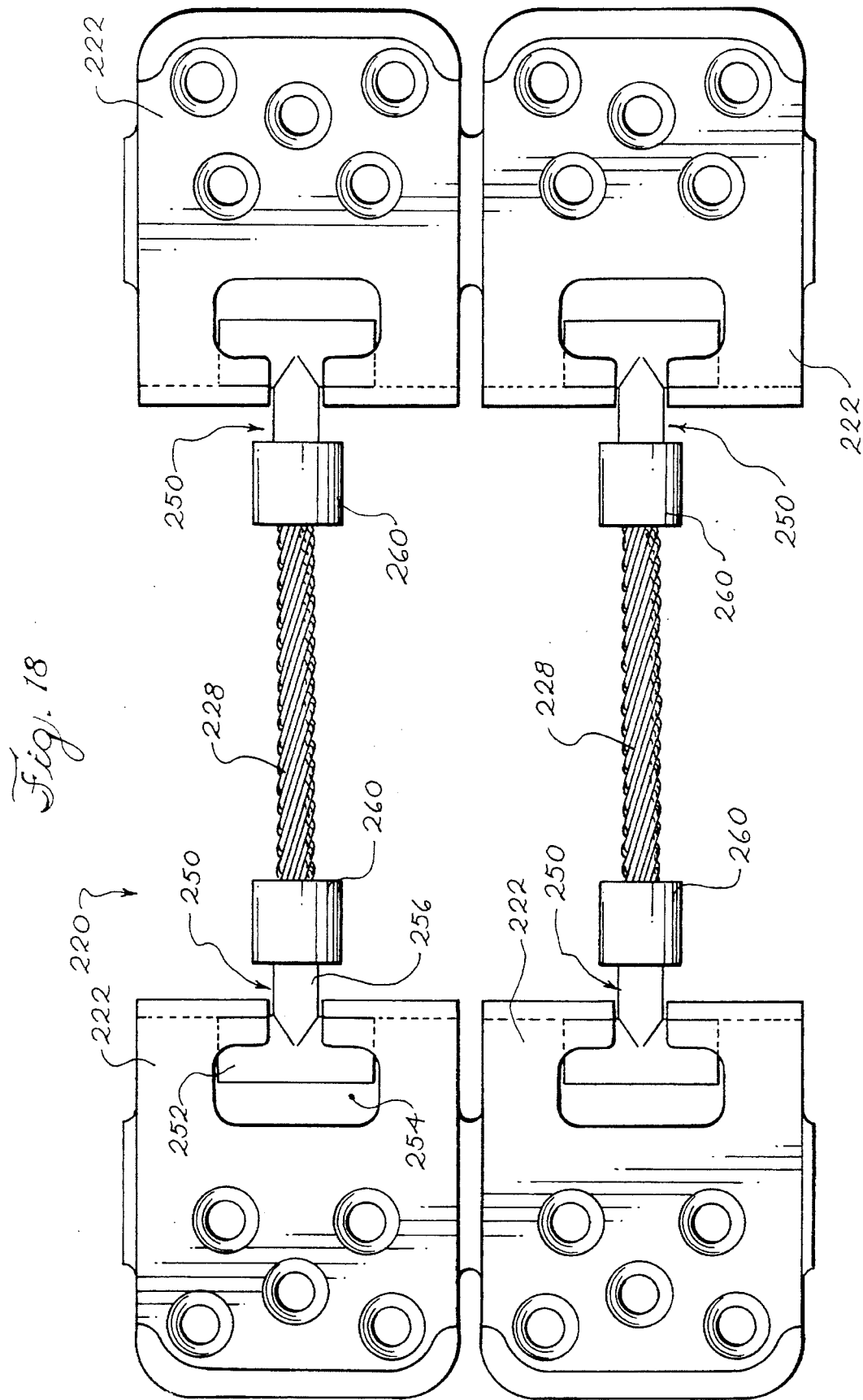

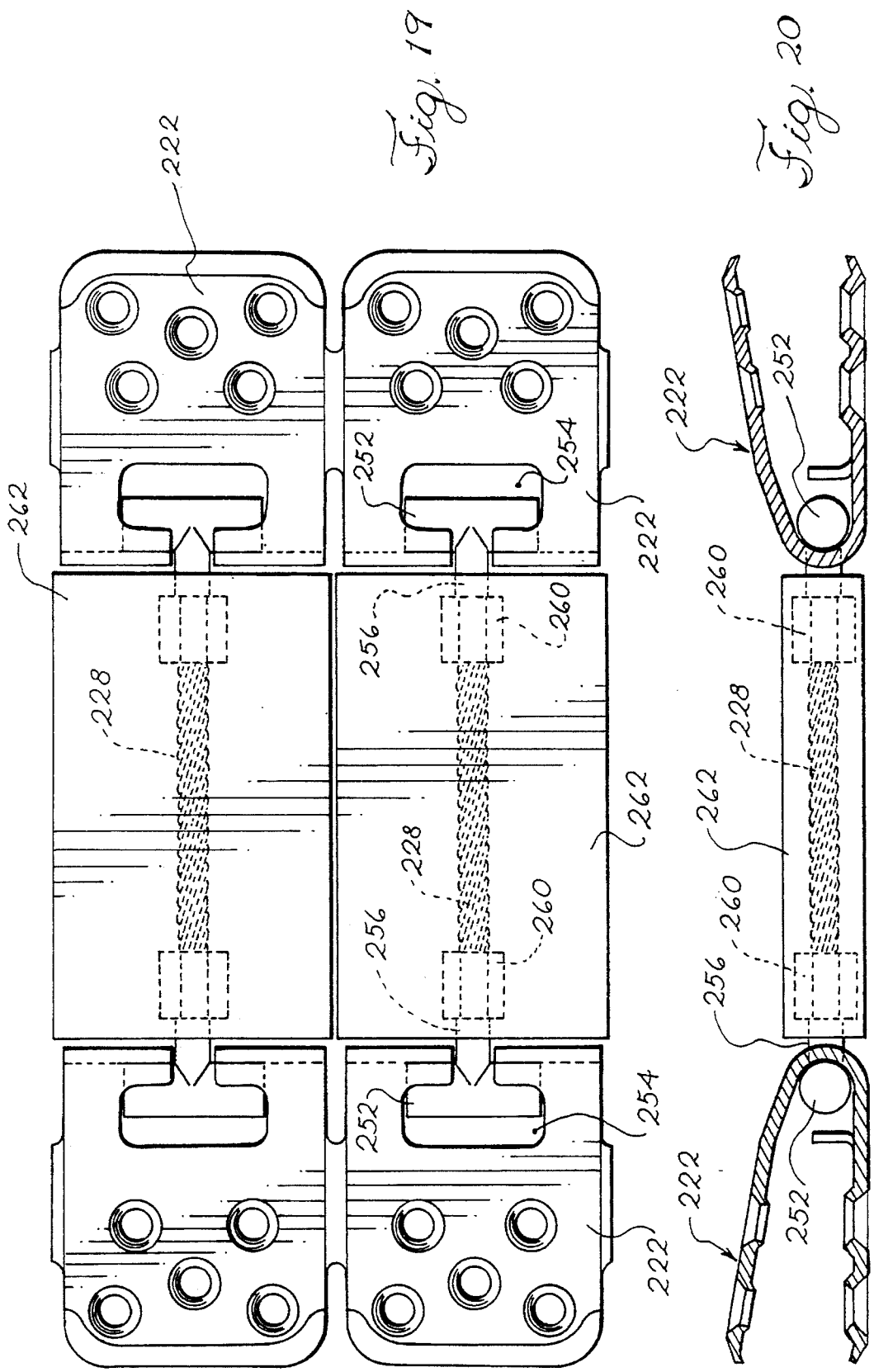

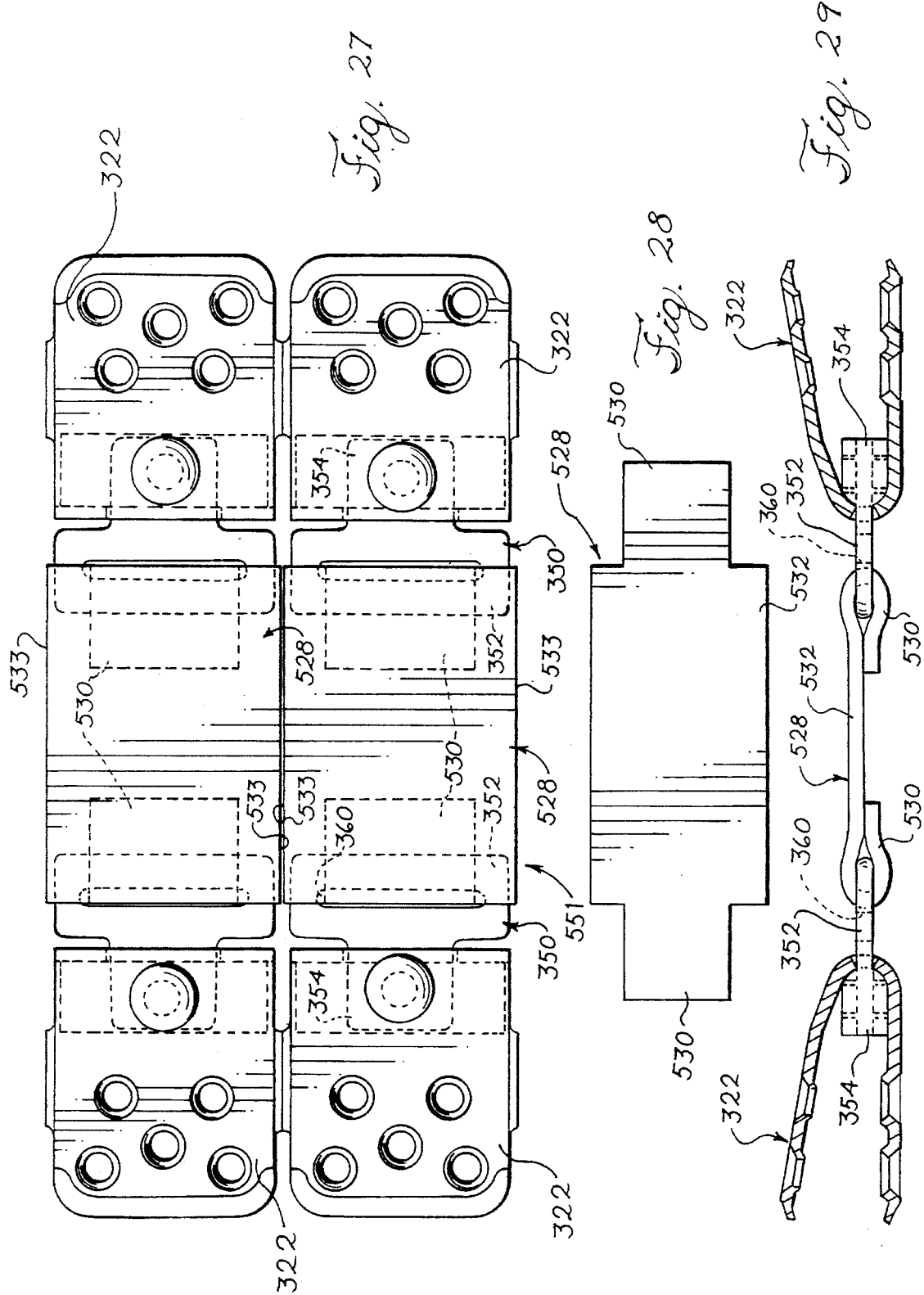

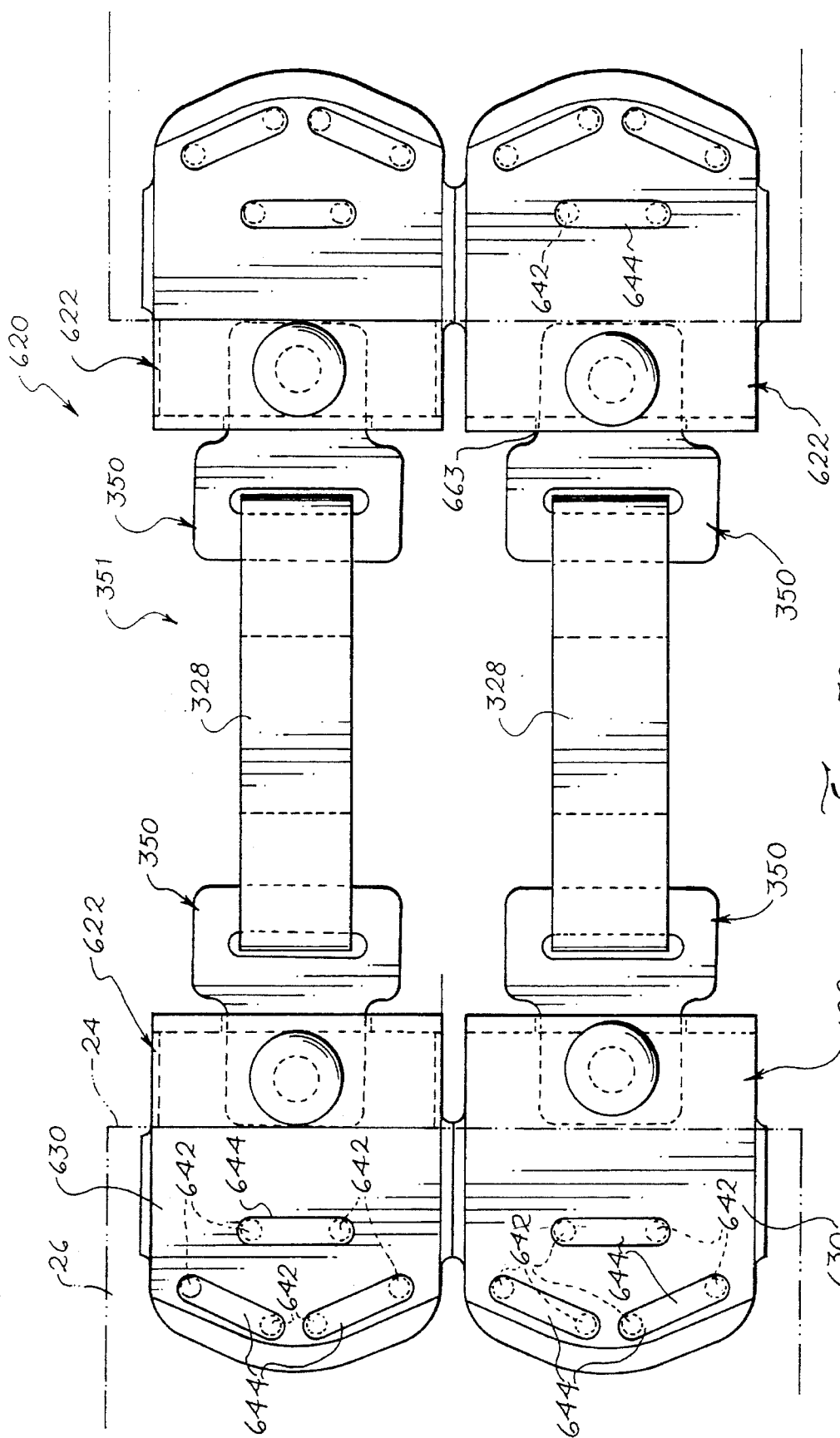

SPLICE ASSEMBLIES FOR CONNECTING BELT ENDS

CROSS-REFERENCE TO RELATED APPLICATIONS

This is a Continuation-in-Part of U.S. patent application Ser. No. 08/061,163 filed May 13, 1993, now U.S. Pat. No 5,348,143, entitled "Splice Assembly For Connecting Belt Ends" which is hereby incorporated by reference as if fully reproduced herein.

FIELD OF THE INVENTION

This invention relates to splice assemblies for conveyor belts or the like, and more particularly, to a replacement for a hinge pin used to join hinge-type of belt fasteners together.

BACKGROUND OF THE INVENTION

Conveyor belts often come in relatively large widths, for example, 24, 48, 60 or more inches in width. The belts are often troughed so that the longitudinal sides of the belt are canted upwardly and outwardly from a lower central section to contain the conveyed material so as to prevent the material from falling off the sides of the belt. Commonly used hinged belt fasteners are joined to opposite ends of the belt, and hinge loops are interdigitated to form a common bore into which is inserted a hinge pin that prevents the hinge loops from separating. The hinge loops exert transverse shear forces on the elongated pin, which is in one piece when inserted into the bore. When the belt is troughed, the flexible hinge pin, which is often a length of flexible cable, bends at the locations of the canted side sections and the lower center section of a troughed belt. These cable-like hinge pins are constructed to withstand large, tensile loads; but when used as hinge pins, are subject to transverse shear loads to which the cable is not well suited. The transverse loads from the belt loops tend to cut or wear grooves in the hinge pin at the hinge loop locations across the splice section that usually preclude a removal of the hinge pin after it has been in use for a while.

The troughed hinge pin usually breaks into at least three pieces with the center piece being difficult to remove. Often the ends of the hinge pins are struck by equipment or otherwise damaged so that there is not a good end to grip to pull the hinge pin from the loops of the interdigitated belt fastener loops. Even if there is a good end to grip and the pin is broken, only the outer end section will be gripped and pulled. Thus, it is often necessary to cut the belt fasteners off the belt end when a hinge pin cannot be removed. Accordingly, the conventional cable hinge pin used with hinge-type belt fasteners is not easy to replace when it has been in use for a while.

Often in coal mines or in material handling applications, the belt length is desired to be changed relatively frequently either to make the belt longer or to make it shorter. Usually, a section of belt is either added or subtracted. This belt section is usually connected by hinge belt fasteners with a flexible hinge cable-type pin which, if broken, is very difficult, if not impossible, to remove. Thus, there is a need to provide an improved hinge pin replacement.

The belt fasteners are hinged as the endless belts are wrapped about pulleys or drums when travelling from an upper run to a lower run. For example, the belt fasteners travel about a nine inch diameter drum, and are expected to fit the curve of such a diameter much in the manner that the belt does.

A particular problem that needs to be addressed with these types of belt fasteners is that of preventing sifting of fines or fine particulate through the splice formed by the belt fasteners and the hinge pin. Thus, the hinge pin replacement should not be such an open device that fines fall readily through the splice. Also, belt scrapers often scrape the top of the conveyor belt, and the hinge pin replacement should not be damaged by such scrapers as it passes by the scrapers. The material being conveyed is often very abrasive, and the hinge pin replacement should be capable of withstanding abrasion or wear.

Solid rod hinge pins have been used rather than the flexible, cable hinge pins, with the solid rod hinge pins extending through the passageway defined by the overlapping fastener hoops. However, the solid rods have been found undesirable since they do not provide the requisite flexibility necessary to flex a belt across its width to form a trough, as required in many conveyor belt applications.

SUMMARY OF THE INVENTION

In accordance with the present invention, a splice assembly is provided for interconnecting a pair of belt ends and includes a belt splice extending between belt fasteners on the ends of the belt, with the belt splice having at least one flexible, elongated tensile member such as a cable or strap extending between the belt ends in a manner which allows for flexing and troughing of the belt at the interconnected belt ends. A plurality of spaced belt fasteners are affixed in spaced relation along the widths of respective belt ends to be joined, with the ends of each belt splice being joined to respective belt fasteners on opposite belt ends to interconnect the pair of belt ends. The use of individual spaced, adjacent belt fasteners allows bending of the belt between adjacent belt fasteners and thereby allows troughing of the continuous belt across its width. The belt ends are interconnected by a plurality of elongated tensile members such as a cable or strap, with each of the cables or straps bearing a tensile load to hold the belt ends together. Thereby, the belt ends are securely interconnected to form a continuous belt, with no cable being subjected to a heavy, transverse loading as in the case of a conventional hinge pin. In accordance with another aspect of the present invention, each elongated tensile member is buried in a splice body or slab such that the cables or straps are not exposed to be snagged or caught by material on the conveyor or equipment such as belt scrapers. The cable or strap splice has the cables or straps substantially encased in a slab of resilient material with only the cable or strap ends extending outward of the support slab, whereby the support slab shields the cables or straps from being snagged or from being abraded. The plurality of cables or straps are maintained generally parallel to one another by the support slab with the support slab allowing cables or straps to be picked up and placed at the belt ends in groups rather than individually. Finally, the ends of the support slab from which the cable or strap ends extend between the opposed sets of belt fasteners may be curved over the belt fastener loops to provide a support slab that covers substantially the space between the belt ends to reduce the space available for fines to sift through the splice.

The preferred belt splices have a width in a direction transverse to the belt length to have sides adjacent each other to reduce the amount of sifting of the conveyed material through the spaces between adjacent belt splices.

The invention will become more fully understood as the description proceeds and the features of novelty which

3 characterize this invention will be pointed out with clarity.

BRIEF DESCRIPTION OF THE DRAWINGS

In the drawings, wherein like elements are referenced alike:

FIG. 6 is a top plan view of an alternative embodiment cable splice embodying various features of the present invention;

FIG. 7 is a sectional view of the splice assembly taken along line 7—7 of FIG. 6;

FIG. 8 is a bottom view of the splice assembly of FIG. 6;

FIG. 9 AND 9A are plan views of an insert for guiding the end members of the cables;

FIG. 10 is an end elevational view of the insert of FIG. 9;

FIG. 11 is a side elevational of the insert of FIG. 9;

FIG. 12 is a perspective view of the insert of FIG. 9;

FIG. 18 is a plan view of another splice assembly using cables embodying various features of the present invention;

FIG. 19 is a plan view of another splice assembly using cables, with the cables embedded in a slab to provide protection from sifting;

FIG. 20 is a side elevational view of the splice assembly of FIG. 19;

FIG. 27 is a plan view of another strap splice assembly, embodying various features of the present invention;

FIG. 28 is a plan view of a strap used to form the strap splice assembly of FIG. 27;

FIG. 29 is a side elevational view of the splice assembly of FIG. 27;

FIG. 30 is a plan view of still another cable splice assembly using straps, embodying various features of the present invention;

DETAILED DESCRIPTION OF THE PREFERRED EMBODIMENTS

Figure 13:
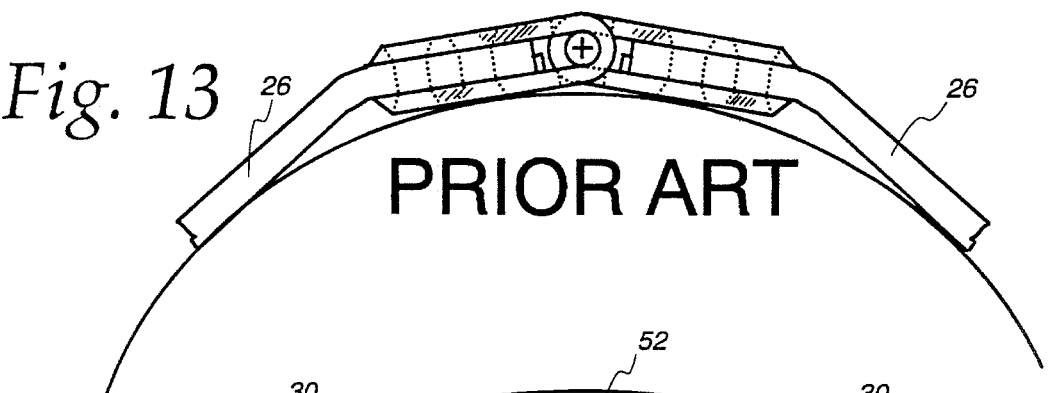
FIG. 13 is a side elevational view of a prior art splice assembly, shown with the belt passing around a curved surface.
Figure 31:
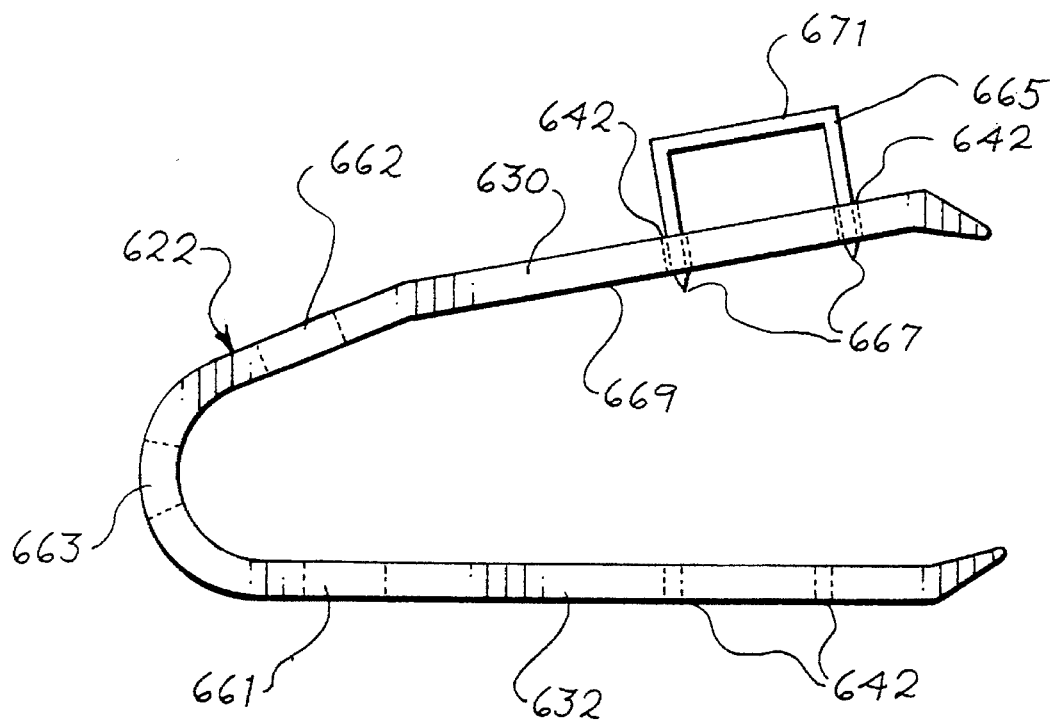
FIG. 31 is a side elevational view of a representative belt fastener suitable for use with the belt and strap splices of the present invention, showing the staking of staples to the belt.

A first embodiment of a splice assembly embodying various features of the present invention is illustrated in FIGS. 1–5 and 15, and referred to generally by reference numeral 20. A second splice assembly embodying various features of the present invention is illustrated in FIGS. 6–8 and 16, and referred to generally be reference numeral 120. A prior art splice assembly is illustrated in FIG. 13. Additional splice assemblies using cables are illustrated in FIGS. 18–20 and FIG. 26, and additional splice assemblies using straps are illustrated in FIGS. 21–25 and FIGS. 27–30. An additional belt fastener suitable for use with each of the splice assemblies is illustrated in FIG. 31.

With initial reference to the cable splice assembly 20 of the first embodiment, illustrated in FIGS. 1–4 and 9, the splice assembly 20 comprises a plurality of belt fasteners 22 affixed across the width of respective, opposing ends 24 of the belt 26 to be joined, with a plurality of elongated, tensile members in the form of short cables 28 spanning respective opposing belt fasteners 22.

Figure 1:
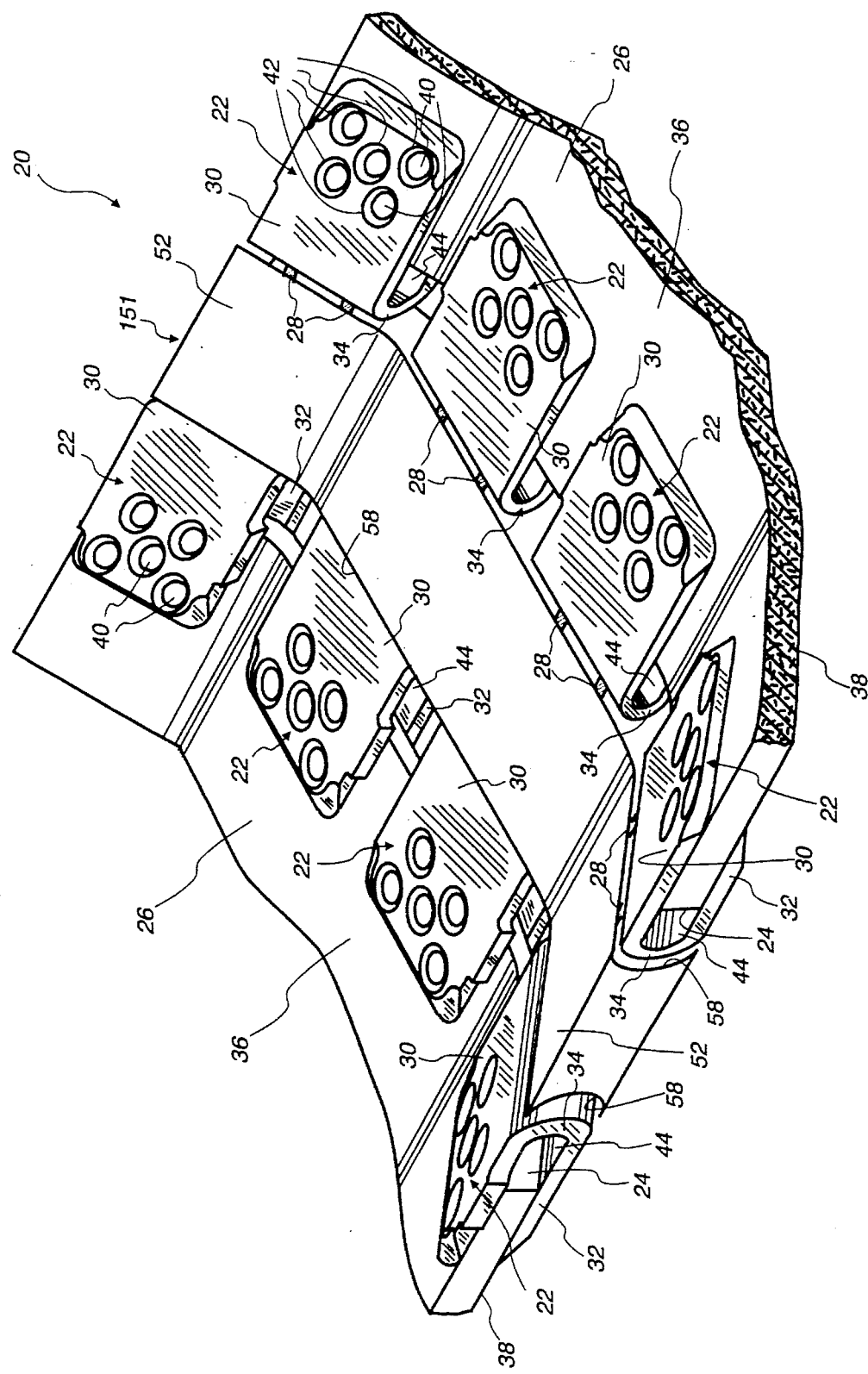
FIG. 1 is a fragmentary, perspective view of a splice assembly using cables embodying various features of the present invention, shown connecting two troughed belt ends.
Figure 2:
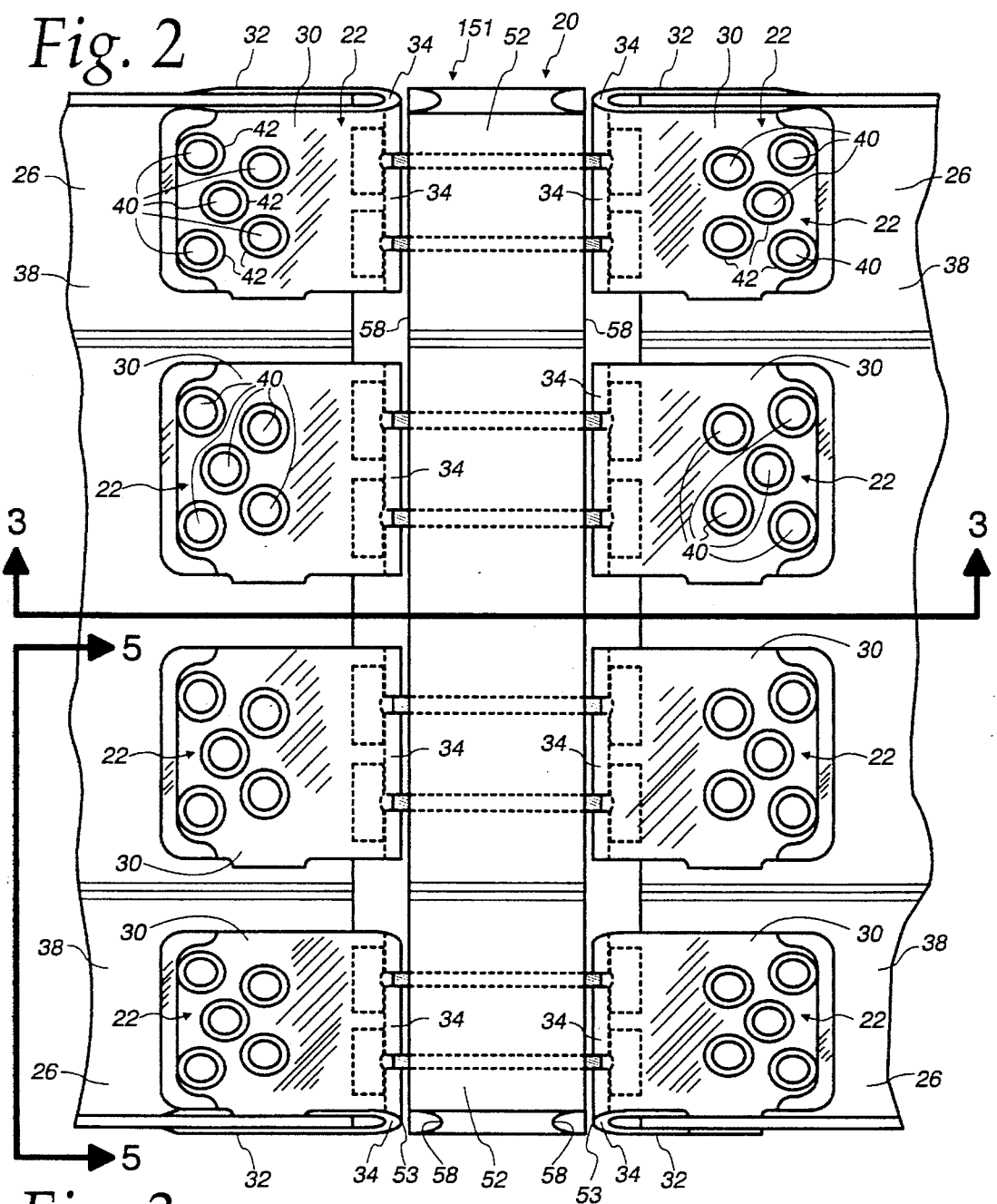
FIG. 2 is a top plan view of the splice assembly of FIG. 1.

In the illustrated embodiment, each of the belt fasteners 22 has a body made of metal and each comprises an upper plate 30 and a lower plate 32 interconnected by an integral loop 34. With reference to FIG. 1, which illustrates the upper side of the belt 26, the entire interior surface of the upper plate 30 is positioned flush against the upper side 36 of the belt 26, and the entire interior surface of the lower plate 32 is positioned flush against the lower side 38 of the belt 26. The upper and lower plates 30 and 32 are pressed tightly against the belt 26 by a plurality of rivets 40 to fasten the belt fasteners 22 to their respective belt ends 24.

Both the upper and lower plates 30 and 32 of the belt fasteners 22 include a plurality of apertures or holes 42 therein, with the holes 42 in the upper plate 30 being in registration with the holes 42 in the lower plate 32. Fasteners such as rivets 40 are passed through holes 42 in the upper plates 30 of the belt fasteners and penetrate the belt and then are passed through the holes 42 in the lower plates 32 of the belt fasteners 22 and serve to fasten the belt fasteners 22 securely to the belt 26. Other fasteners such as staples, bolts or the like could be used in lieu of rivets.

The rivets 40 have enlarged preformed heads with shanks that are inserted from the upper side 36 of the belt 26 and the upper and lower plates 30 and 32 pressed together about the belt 26 as the rivet heads are pressed against the upper plate 30 of the belt fasteners 22. With the belt fasteners 22 and rivets 40 secured in this manner, the leading ends of the rivets 40 are flared outwardly to form enlarged rivet ends to maintain the belt fasteners 22 securely fastened to the belt 26 near respective belt ends 24. Various methods of attaching belt fasteners to belt ends are disclosed in the prior art, and the invention is not limited to any particular method for attaching belt fasteners to belt ends.

As best seen in FIG. 1, in the illustrated embodiment the belt ends 24 do not extend into the loop 34 portion of the belt fasteners 22, so that there is an opening or gap 44 between the belt ends 24 and the rounded internal extremity of the loop portion 34 of the belt fasteners 22. The belt fasteners 22 have slots 48 formed in the lower side 49 of the loop portion 34 thereof. The slots 48 could be formed in the upper side of the loop portion 34, rather than the lower side 49. The shape of the slots 48 corresponds to the shape of end members 50 integral with the cable lengths 28, for reasons which are delineated below.

Figure 14:
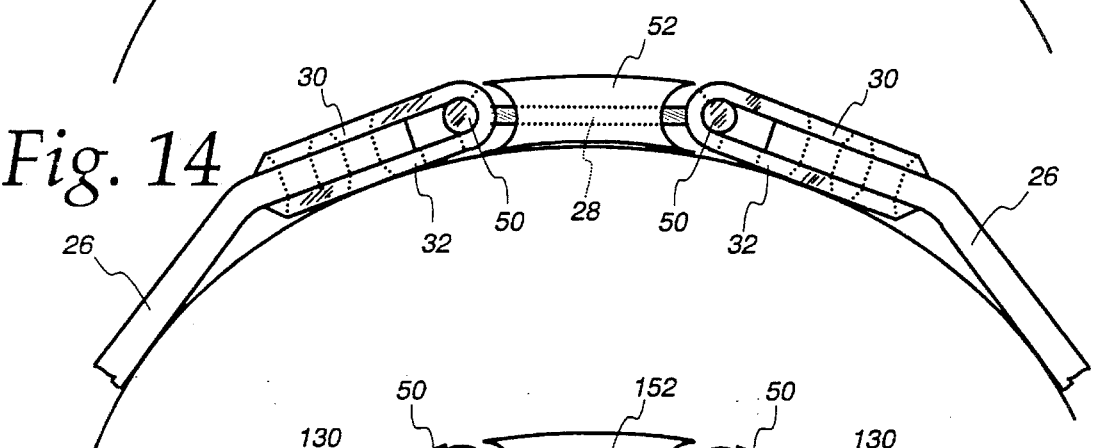
FIG. 14 is a side elevational view of the splice assembly of FIGS. 1–5, shown with the belt passing around a curved surface.
Figure 15:
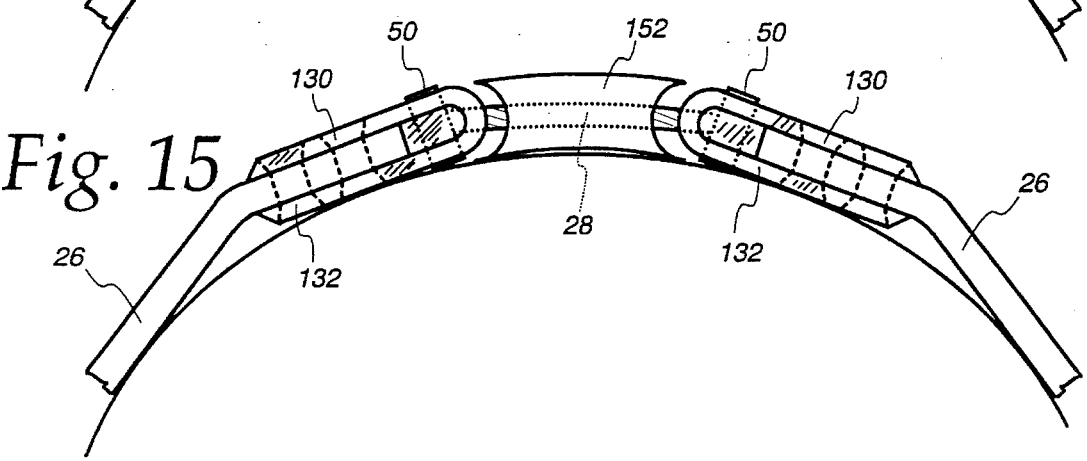
FIG. 15 is a side elevational view of the splice assembly of FIGS. 6–8, shown with the belt passing around a curved surface.
Figure 16:
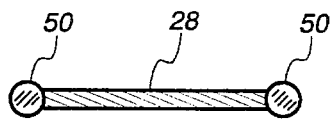
FIG. 16 is a side elevational view of a cable incorporating various features of the present invention.

In the illustrated embodiment, the belt splice 151 is employed to interconnect the belt fasteners 22 of opposing belt ends. The splice 151 comprises a plurality of short cables 28 of generally equal length that are supported in parallel relation to one another by a rectangular supporting body or slab 52. The cables 28 extend through the slab 52, with the opposite ends of each of the cable 28 protruding external of the support slab 52. The slab 52 serves several functions. In addition to protecting the cables 28 from nicks and cuts and being abraded by conveyor supports, belt scrapers or the like or from being snagged on equipment, the slab 52 also maintains spacing and orientation of the plurality of cables 28 therethrough. Additionally, the slab 52 is preferably sized and shaped to prevent sifting through the splice assembly as will be explained. The slab is preferably made of a tough, flexible plastic material, such as urethane, and is easily bendable about the drums at the ends of the conveyor runs, as shown in FIGS. 13–15, and is molded about the cables 28. Each of the cables 28 has end members 50 which are cylindrical in shape in the illustrated embodiment, but may be any of a wide variety of shapes. A cylindrical end member 50 is attached to each of the ends of the cables 28, so that each cable 28 has an end member 50 at both of its ends. The support slab 52 is preferably proportioned and configured such that there is a small amount of space between the end members 50 and the support slab 52, with there being only a small amount of cable 28 exposed between the end members 50 and the support slab 52.

Figure 17:
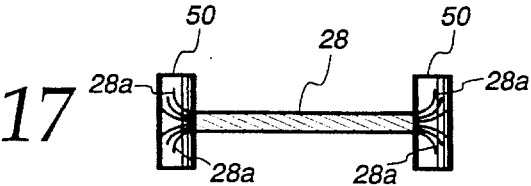
FIG. 17 is a plan view of the cable of FIG. 11.

As best seen in FIG. 17, the end members 50 are joined to the cable 28 by cable wire ends 28a that are spread apart from the spirally wound wires that make up the cable; and these splayed wire ends 50a are spaced in the cable end members 50 that are molded on to the wire ends 28a. By way of example only, the cables 28 may be 0.1875 inch diameter steel wire rope, 7×7 strand core or equivalent; and the end members 50 are made of zinc or brass alloy and are molded on the splayed cable ends 28a. Other methods of attachment of the end members to the cable may be used. The splaying or spreading of the cable wires in the molded end members provides a greater resistance to the cable pulling from the end members under high tension loading. By way of example only, the illustrated end members are 0.25 inch in diameter and 0.600 inch in height. The cables illustrated in FIG. 17 are about several inches in length, the illustrated cables being two inches in length from the center of the left end member 50 to the center of the right end member 50. Manifestly, the materials and dimensions of the cables and end members 50 may vary substantially from those given herein, which are only by way of example.

The aforementioned slots 48 in the loop portions 34 of the belt fasteners 22 are provided to engagingly receive respective end members 50. That is, after a plurality of belt fasteners 22 are affixed along the entire width of the two belt ends 24 to be joined, each of the end members 50 protruding from one side of the support slab 52 are inserted into respective slots 48 of the belt fasteners 22 on one of the belt ends 24 and accommodated within the gap 44. Thereafter, each of the end members 50 protruding from the opposite side of the support slab 52 are inserted into respective slots 48 of the belt fasteners 22 on the other belt end 24, with the belt ends 24 thereby being joined together by the lengths of cable 28.

Additional protection of the cable splice 151 from accelerated wear due to abrasion or contact with the load being carried is realized by having the slots 48 being formed in the lower plate 32 of the belt fastener 22, with there being no slots formed in the upper plate 30. The disadvantage of having the slots in the top plate is that slots in the top plate allow material to become packed in the slots, thereby making it more difficult to take the splice apart.

Figure 4:
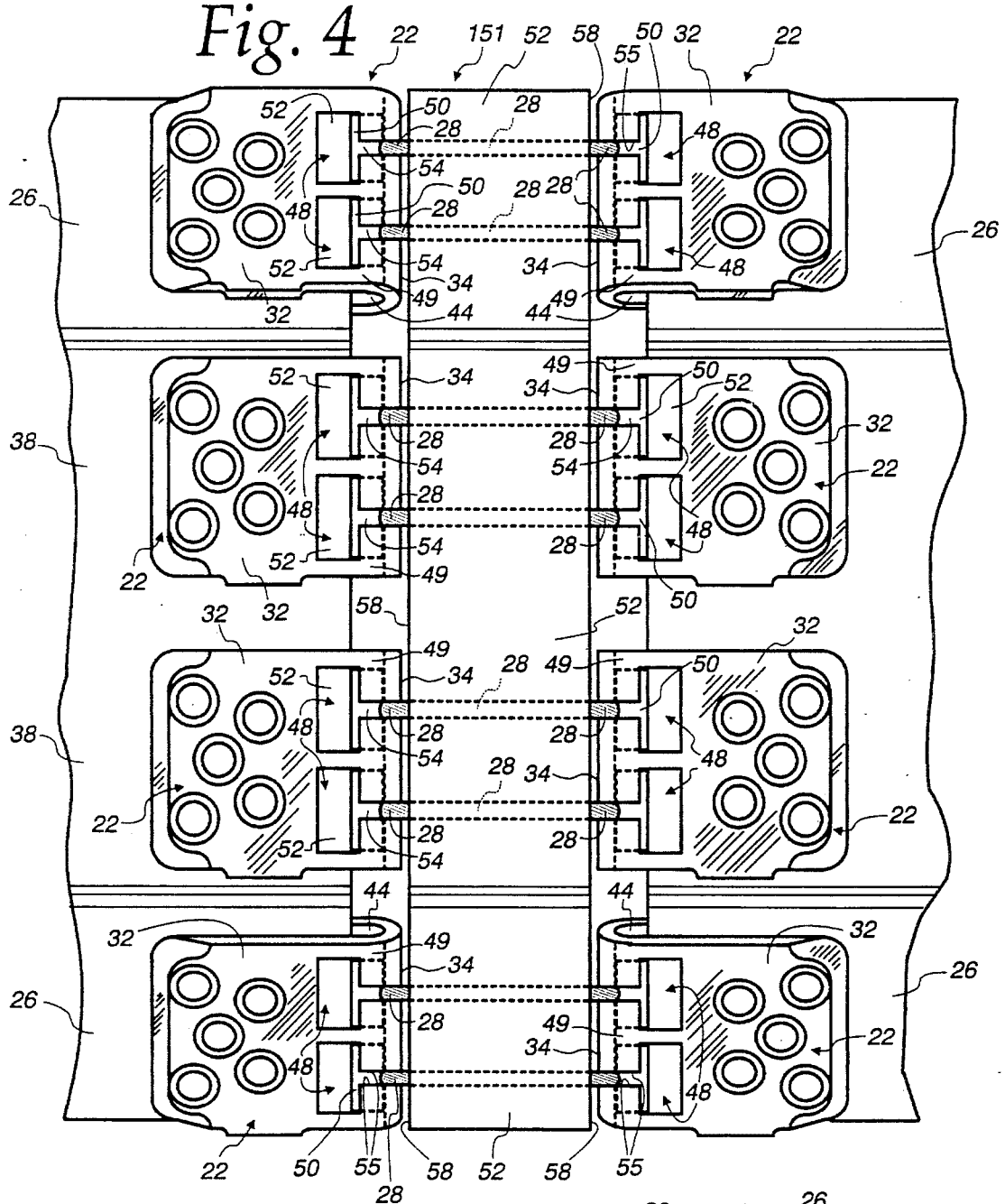
FIG. 4 is a bottom view of the splice assembly of FIG. 1, showing the opposite side of the splice assembly from that shown in FIG. 2.
Figure 5:
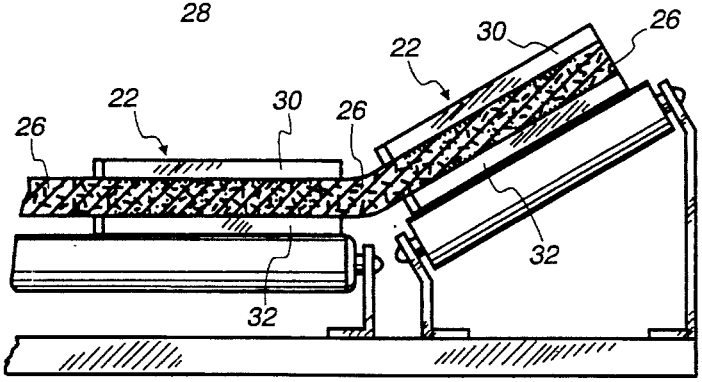
FIG. 5 is a sectional view of the splice assembly taken along line 5—5 of FIG. 2 showing the belt troughed by idlers.

As best seen in FIG. 4, each of the slots 48 comprises a rectangular portion 48a proportioned to receive a respective cylindrical end member 50 therein, with a narrow slot portion 54 in communication with the end-member-receiving rectangular portion 48a for accommodating the cable 28. The narrow slot portion 54 extends from the rectangular portion 48a of the slot 48 and extends over a substantial length of the loop portion 34 of the belt fasteners 22. That is, upon insertion of a cylindrical end member 50 into its respective rectangular slot portions 48a, the cable 28 integral with that end member 50 is received in the narrow portion 54 of the slot 48.

The rectangular slot portions 48a are spaced from the rounded internal extremity of the loop portion 34 of the belt fasteners 22 so that after passing through the rectangular slot 48 of a belt fastener 22 into the gap 44, and being pulled in the direction of the internal extremity of the loop portion 34 of the belt fasteners 22, the cylindrical end members 50 are slid into abutment with the internal extremity of the loop portion 34, whereat the end members 50 are out of alignment with the rectangular slot portions 48a and therefore do not slide out of their respective rectangular slots during operation of the belt 26. Thereby, engagement between each of the end members 50 of the cables 28 and the respective belt fasteners 22 is maintained. Accordingly, each of the cables 28 are connected at their opposite ends to respective belt fasteners 22 in a manner which maintains engagement of the end members 50 of the cables 28 with respective belt fasteners 22 throughout belt usage.

Figure 3:
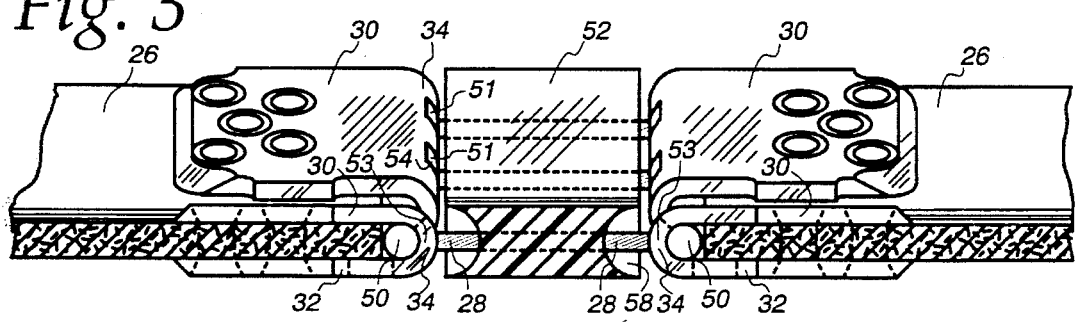
FIG. 3 is a sectional view of the splice assembly taken along line 3—3 of FIG. 2.

The narrow slot portions 54, which receive respective cables 28 therein, allow the cables 28 to move freely within their respective narrow slot portions 54. The narrow slots 54 extend from the larger rectangular slot portions 48a in the lower side 49 of the loop portion 34, with the narrow slots 54 extending approximately three-quarters of the way around the arcuate loop portion 34 of the belt fastener 22 to terminate at an endwall 51 (FIG. 3).

During its return run, the lower returning run of the belt 26 may be straight or flat with the belt fasteners 22 on either side of the support slab 52 both being generally horizontal. During the upper run of the conveyor, the belt 26 may be troughed as in FIG. 1, with the belt being flexed in between adjacent belt fasteners 22. When the belt goes about the driving drum or idler drum, the cable splices may conform to the drum surface as shown in FIGS. 13–15, with the upper side 36 of the belt 26 being radially outward and the lower side 38 of the belt 26 being radially inward. When the splice assembly 20 changes its position, each of the cables 28 may be swung within a respective narrow slot 54 in the direction of the rectangular slot portion 48a. More specifically, when passing over a curved path of travel, such as when traveling about an idler drum, the cables will conform to the surface of the drum and the cable end members 50 should not pivot in the gaps 44.

During normal operation, the cables 28 slide between a horizontal position at which the cable extends outward from the internal extremity of the loop portion 34, generally parallel to the upper and lower plates 30 and 32, at one extremity, and a position somewhere between this horizontal position and a vertical position at which the cable extends perpendicularly from the lower plate side of the narrow slot 54, at its other extremity. Hence, it is generally not required that the narrow slots 54 extend around the loop portion 34 of the belt fasteners 22 past the midarc of the internal extremity of the belt fasteners 22. However, as a precaution against wear of the cables 28 in the event of slight reverse-flexing of the belt 26, whereby the cables 28 are swung in a direction opposite the rectangular slot portions 48a, slightly past horizontal, the narrow slots 54 extend approximately three-quarters of the way around the loop 34 to endwalls 51.

The presence of particulate within the gap 44 of the belt fasteners 22 would accelerate abrasive wearing of the splice assembly 20. By having the slots not extending into the upper plate of the belt fasteners, there is less likelihood that sifting material will move into the gap 44. Often the sifting material may be sand, coal, grit or other generally abrasive material.

To reduce the sifting of particulate through the cable splice assembly, the sides 58 (FIG. 7) of the support slab 52 extend to and curve about the curved, leading ends 53 of the loop portion 34 of the belt fasteners 22 therein. The length of the cables 28 extending outward of the slab 52 is short with the leading end 53 of the loop portion 34 of the belt fasteners 22 being maintained within the inwardly curving side portion 58 of the support slab 52. Since the cables 28 slide within respective narrow slot portions 54 upon each belt flexion, with only a narrow space between the cables 28 and their respective belt fastener surfaces 55 which define the narrow slots 54, there is little space for particulates to sift through the splice assembly. The inwardly curved sides 58 of the support slab 52 shield the portions of the cable lengths 28 in proximity with the belt fasteners 22 from particulate which may otherwise accelerate wear of the cables 28.

Another embodiment of the invention will now be described in connection with FIGS. 6–8. In this embodiment, the end members 50 fixed to the ends of the cables 28 are inserted into apertures in the belt fasteners 122 by force-fit engagement; and the end members are vertical or perpendicular to the belt, rather than being horizontal and in the plane of the belt as in FIGS. 1–5.

With reference to FIGS. 6–8, the belt fasteners 122 employed in this embodiment are very similar to the belt fasteners 22 employed in the previously described embodiment, and are attached to the ends 24 of the belt 26 in the manner described pertaining to the belt fasteners 22 of the other embodiment of FIGS. 1–5 and 14. In this embodiment, circular apertures 152 are formed in both the upper and lower plates 130 and 132, each aperture having a diameter proportioned slightly smaller than the diameter of the aforementioned cylindrical end members 50 fixed to the ends of the cables 28. Thus, the end members 50 may be driven into a force-fit into the apertures 152 of both the upper and lower plates 130 and 132 to securely engage the end members to respective belt fasteners 122.

The slots 148 further include a narrow slot portion 154 extending about the loop portion 134 of the belt fasteners 122, from the circular aperture 152 in the upper plate 130 to the circular aperture 152 in the lower plate 132. The narrow slot portion 154 accommodates the cable 28 therein. Accordingly, each cable 28 is secured to a respective belt fastener 122 at both its ends in a manner which prevents movement of the cable ends with respect to the belt fasteners 122.

The aforementioned arrangement of a plurality of cables 28 extending parallel to one another through a support slab 52 allows for picking up a plurality of cables 28 at one time, rather than having to pick up each of the cables 28 individually, and also allows for placement of a group of end members 50 in registration with respective slots 148 for driving of the end members 50 into their respective apertures 152, rather than separately handling and driving each cable and its end members individually.

It has been found to be difficult to force-fit the end members 50 into both the upper and lower apertures 152 of their respective belt fasteners 122. That is, as an end member 50 is force-fit through the upper aperture 152 in the upper plate 130, the upper aperture guides further advancement of the end member 50 and the open top plate is driven down to pivot about its loop in an arcuate path. Hence, the lower end of the end member 50 may not be in alignment with the aperture 152 in the lower plate 132 when advanced thereto.

To assist in accurate passage of the end members 50 into the apertures 152 in both the upper and lower plates 130 and 132, so that the end members 50 register with their respective apertures 152 in the lower plates 132 when force-fitted into their respective apertures in the upper plates 130, retainer inserts 160 may be employed to guide the end members 50 and to retain the end members in the belt fastener loops.

The retainer insert 160 of the preferred embodiment is illustrated in FIGS. 9–12. As best seen in FIG. 9A, retainer inserts 160 are disposable between the upper and lower plates 130 and 132 of each of the belt fasteners 122 adjacent the loop portion 134 of the belt fasteners 122. Hence, the retainer insert is shaped and proportioned in relation to splice assembly 120 into which it is to be inserted. The retainer insert has a rounded front surface 162 and a flat back surface 164, giving the retainer insert 160 the D-shaped profile illustrated in FIG. 10. The retainer inserts 160 have a pair of apertures 166 therethrough which guide respective end members 50 from the aperture 152 in the upper plate 130 into the aperture 152 in the lower plate 130. That is, when the retainer insert 160 is inserted within the belt fastener 122 as shown in FIG. 9A, the apertures 166 in the retainer insert 160 register with the apertures 152 in both the upper and lower plates 130 and 132 of the splice assembly 120 to provide a controlled path of travel of the end members 50 forced therethrough. The retainer insert 160 is placed with its upper side 168 adjacent the upper plate 130, its lower side 170 adjacent the lower plate 132, and its rounded front side 162 adjacent the lower portion 134.

The retainer inserts 160 are preferably formed of a suitable plastic/material such as nylon or the like, or alternatively made of metal such as steel, for low friction sliding of the end members 50 through the apertures 166. The illustrated retainer insert 160 further includes a pair of notches 168 in the rounded front surface 162 for accommodating the cables 28 therein when the belt flexes longitudinally.

An alternative splice assembly 220 is illustrated in FIG. 18 wherein T-shaped end members 250 are attached to either end of the cables 228 by swaging. The splice assembly 220 is essentially the same as the splice assembly 20 discussed above, except in the manner of connection of the cables 228 to the end members 250. The splice assembly 220 comprises a plurality of belt fasteners 222 affixed across the width of respective, opposing ends of the belt to be joined, which may be the same as the belt fasteners 22 described previously, with cables 228, having T-shaped end members 250 swaged thereto, spanning the fasteners 222 of opposing belt ends. The T-shaped end members 250 have a cylindrical base portion 252 which is engagingly receivable into the slots 254 of the belt fasteners 22 in the manner discussed above with regard to the splice assembly 20. The ends of respective cables 228 are received in openings provided in the enlarged metal portions 260 located at the end of the cylindrical stem portion 256 of the end members 250, and the cables 228 swaged to the enlarged portions 260, by hammering inwardly on the enlarged portions 260, to grip the cable ends tightly. The swaging of the cables 228 to the end members 250 is sufficiently strong to withstand the tensile loading which is being applied to the end members from the tensioned cables and belts. It is thought that swaging may be less expensive than the molding described hereinbefore.

To reduce the sifting of particulate through the cable splice assembly 220, the cables 228, enlarged portions 260 swaged to the cables 228, and the portion of the stems 256 adjacent to the cables 228 are encased in respective resilient support slabs 262, as shown in FIGS. 19 and 20. The support slabs 262 may be similar to those of the splice assembly 20 shown in FIGS. 1–4, and are preferably generally flat and flexible to allow troughing of the belt across its width. The support slabs 262 are preferably made sufficiently wide that there is very little space between adjacent support slabs 262, and thus very little space through which particulate can fall into the cable splice. A single cable 228 is shown encased in each support slab 262; however, manifestly two or more cables may be encased in a single support slab 262.

Figure 32:
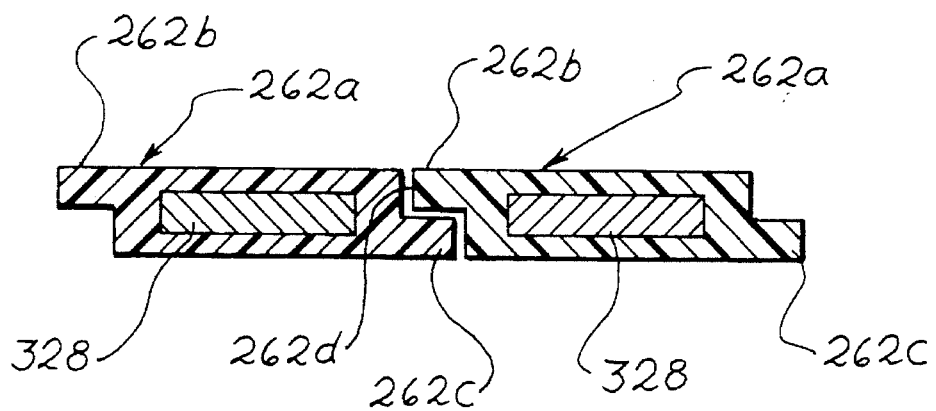
FIG. 32 is a diagrammatic, cross-sectional view of adjacent slabs having interfitting, side edges to reduce sifting between slabs.

Any of the slabs described herein may be modified to having overlapping, longitudinal edges to further reduce sifting between adjacent slabs. More specifically, as illustrated in FIG. 32, adjacent support slabs 262a may have overlapping upper portions 262b and lower portions 262c, which together define a tortious interface 262d, rather than a straight, vertical space between adjacent the slabs. The upper portion 262b is in the form of upper edge flange on one side which projects laterally over a space therebeneath into which is projected the lower portion 262c in the form of a lower edge flange of an adjacent support slab. These upper and lower edge flanges abut at an upper interface, than a horizontal interface, and then a lower interface offset from the upper interface. Manifestly, the overlapping edge portions of adjacent slabs may have other shapes from that disclosed herein.

Another splice assembly is a belt splice assembly 320 which has at least one elongated, tensile member such as a strap to connect belt fasteners of opposing belt ends as illustrated in FIGS. 21–25. In the splice assembly of FIGS. 21–25, a plurality of belt fasteners 322 are affixed across the width of respective, opposing ends 24 of the belt 26 to be joined. As with the aforementioned splice assemblies, the belt fasteners 322 comprise upper and lower plates 330 and 332 having a plurality of apertures or holes 342 therein, with the holes 342 in the upper plate 330 being in registration with the holes 342 in the lower plate 332. Fasteners such as rivets 340 are passed through the holes 342 in the upper plates of the belt fasteners 322 and penetrate the belt and then are passed through the holes 342 in the lower plates of the belt fasteners 322. The ends of the rivets 340 are flared outwardly to securely clamp the upper and lower plates of the belt fastener to respective belt ends 24. The belt fasteners have a loop portion 334 and the belt ends 24 do not extend into the loop portion 334 of the belt fasteners 322, so that there is an opening or gap between the belt ends 24 and the rounded internal extremity of the loop portions 334 of the belt fasteners 322. The belt fasteners 322 each have an aperture 336 in the upper plate and an aperture 338 in the lower plate adjacent their loop portion 334, which apertures 336 and 338 generally align with one another when the belt fastener is clamped to the belt end. Fastening members such as rivets, pins, screws or the like are extendable through the apertures 336 and 338 in the upper and lower plates 330 and 332, to secure a splice 351 to the belt fasteners, as described below.

Figure 22:
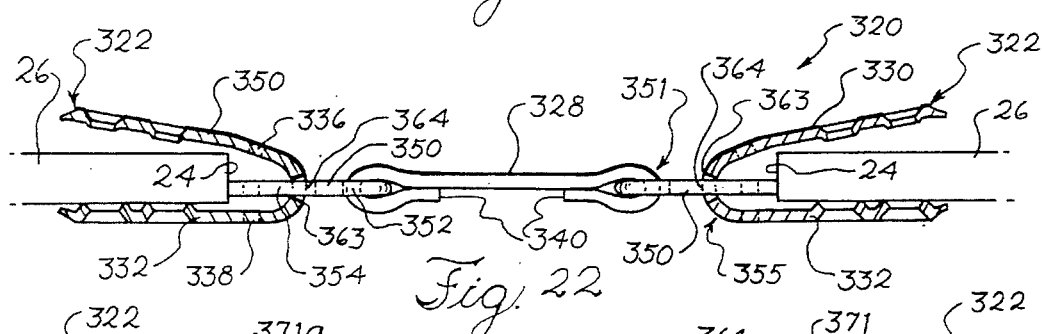
FIG. 22 is a side elevational view of the strap splice assembly of FIG. 21.
Figure 23:
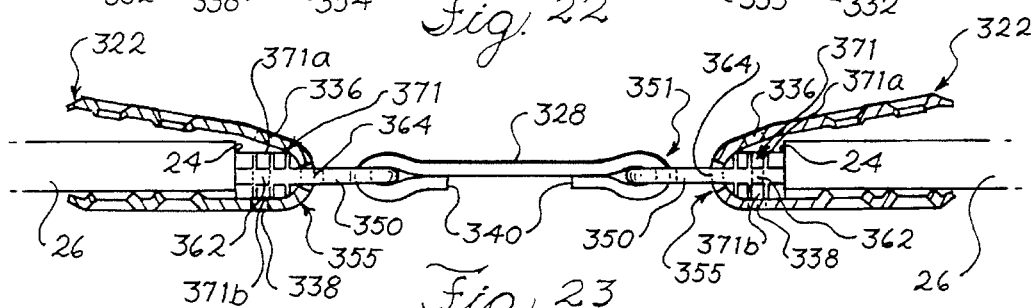
FIG. 23 is a side elevational view of the strap splice assembly of FIG. 21, showing the use of an insert to facilitate connection of the end members to the belt fasteners.
Figure 24:
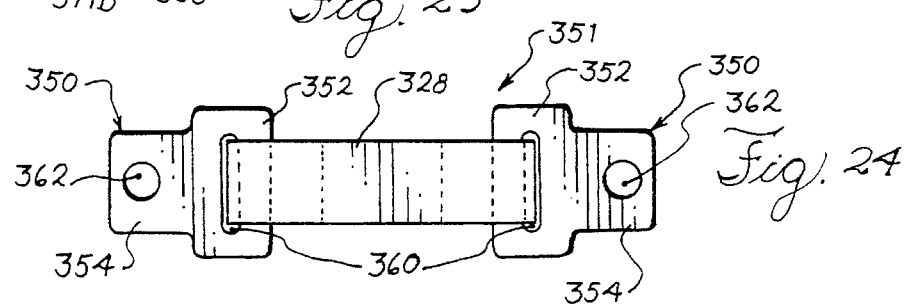
FIG. 24 is a plan view of the strap and end members of the strap splice assembly of FIG. 21.
Figure 25:
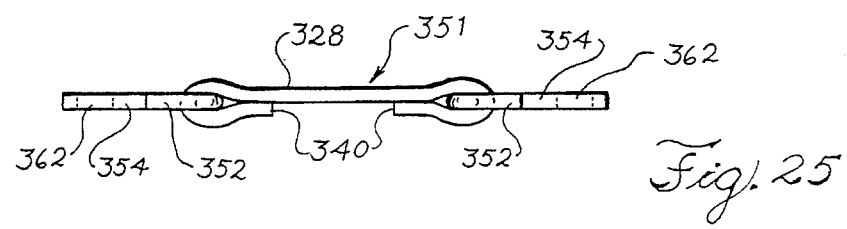
FIG. 25 is a side elevational view of the strap and end members of FIG. 24.

Splice 351 is illustrated in FIGS. 24 and 25 and comprises a strap 328 of material, which may be of any suitable material. The straps are flexible and may be bent about a conveyor drum and must withstand high tensile loads. Plastic straps sold under the tradename Kevlar, and having an outer layer of urethane, have been found particularly well suited for use as the strap 328. Flat, T-shaped end members 350 are attached to either end of the strap 328. As best seen in FIG. 24, the T-shaped end members 350 each comprise an integral strap engaging portion 352 and fastener engaging portion 354. A slit 360 is formed in the strap engaging portion 352 of the end members 350. Opposite ends 340 of the strap 328 are passed through respective slits 360, then folded back over the strap engaging portion 352 of the end member 350 and back onto the strap, so that the strap material overlaps or loops over itself adjacent the end members 350, as best seen in FIGS. 22, 23 and 25. The overlapping strap portions are sewn together to provide a splice 351 comprising a strap 328 having fasteners 350 secured to either end of the strap 328, as illustrated in FIGS. 24 and 25.

Figure 21:
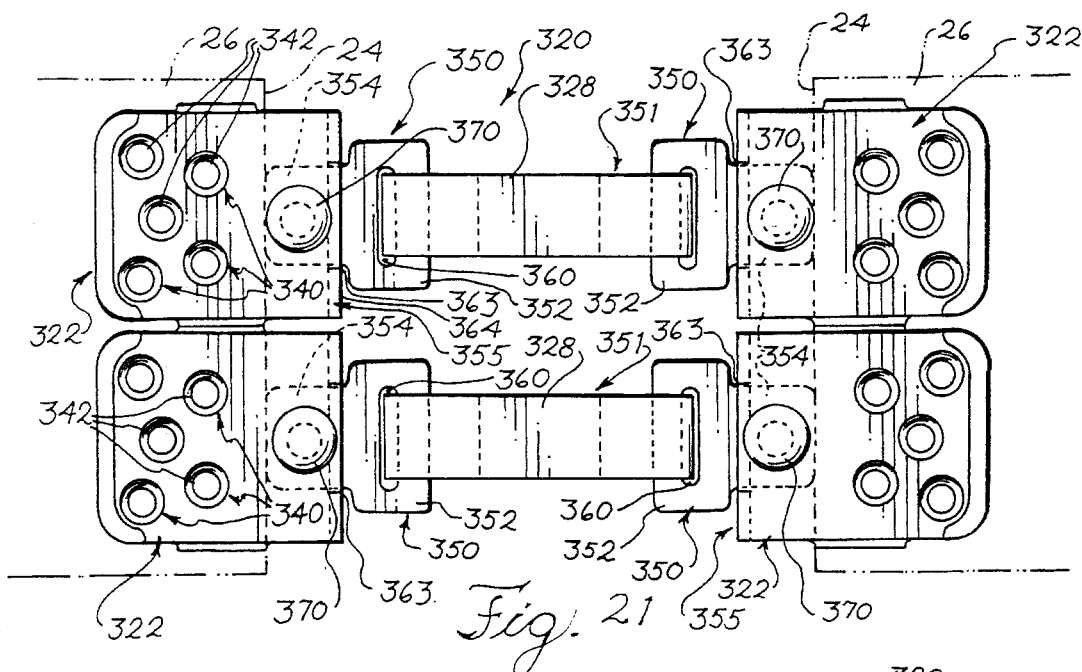
FIG. 21 is a plan view of a strap splice assembly using straps embodying various features of the present invention.

To allow for attachment of the splice 351 to the belt fasteners 322 of opposite belt ends 24, as illustrated in FIG. 21, the end members 350 have an aperture 362 formed therein through the fastener engaging portion 354. The belt fasteners 322 have slits 363 in the ends 364 of their loop portions 355, which are proportioned to receive the fastener engaging portions 354 of the end members 350 therethrough, as best seen in FIG. 21. The fastener engaging portions 354 of the end members 350 are inserted through the slits 363 with the fastener engaging portions 354 being received between the upper and lower plates, in the space between the belt end 24 and the end 364 of the loop portions 355. The apertures 362 of the end members 350 are thereby placed in registration with the apertures 336 and 338 in the upper and lower plates 330 and 332. Rivets 370 are inserted through the apertures 336, 362 and 338 of the belt fastener and end member 350 to connect the end members 350 to the belt fasteners. Manifestly, the rivets may, alternatively, be pins, screws or other suitable fasteners or connecting means. The rivets 370 are preferably flared on one end prior to insertion through the belt fastener, with the unflared end of the rivets 370 inserted through the apertures 336, 362 and 338 and the unflared end of the rivets thereafter flared outwardly to retain the rivets in engagement with their respective belt fasteners 322 and end members 350.

To assure accurate passage of the rivets 370 into the apertures 336 and 338 in the upper and lower plates 330 and 332, so that the rivets 370 register with their respective apertures 338 in the lower plates 332 when force-fitted into their respective apertures 336 in the upper plates 330, inserts 371 may be employed to guide the rivets 370 (see FIG. 23). The inserts 371 are similar to the inserts 160 discussed above. The inserts 371 are disposable inside the loop portion of respective belt fasteners 322 into the gap between the belt end 24 and the end 364 of the loop portion 355. Upon passage of the fastener engaging portion 354 of the splice 351 into the slit 363 of the belt fastener 322, the fastener engaging portion 354 of the splice 351 is received into the insert 371, between upper and lower portions 371*a* and 371*b* thereof. Both the upper and lower portions 371*a* and 371*b* of the insert 371 have apertures, which are in registration with one another. The aperture 362 of the fastener engaging portion 354 of the end member 350 is placed into registration with the upper and lower apertures 371*a* and 371*b* of the insert, and the apertures 336 and 338 of the belt fastener 322 register with the apertures 362 and 371*a* and 371*b* of the end member 350 and insert 371, to allow passage of the rivet 370 through each of these apertures, with the insert 371 serving to accurately guide the passage of the rivet.

Figure 26:
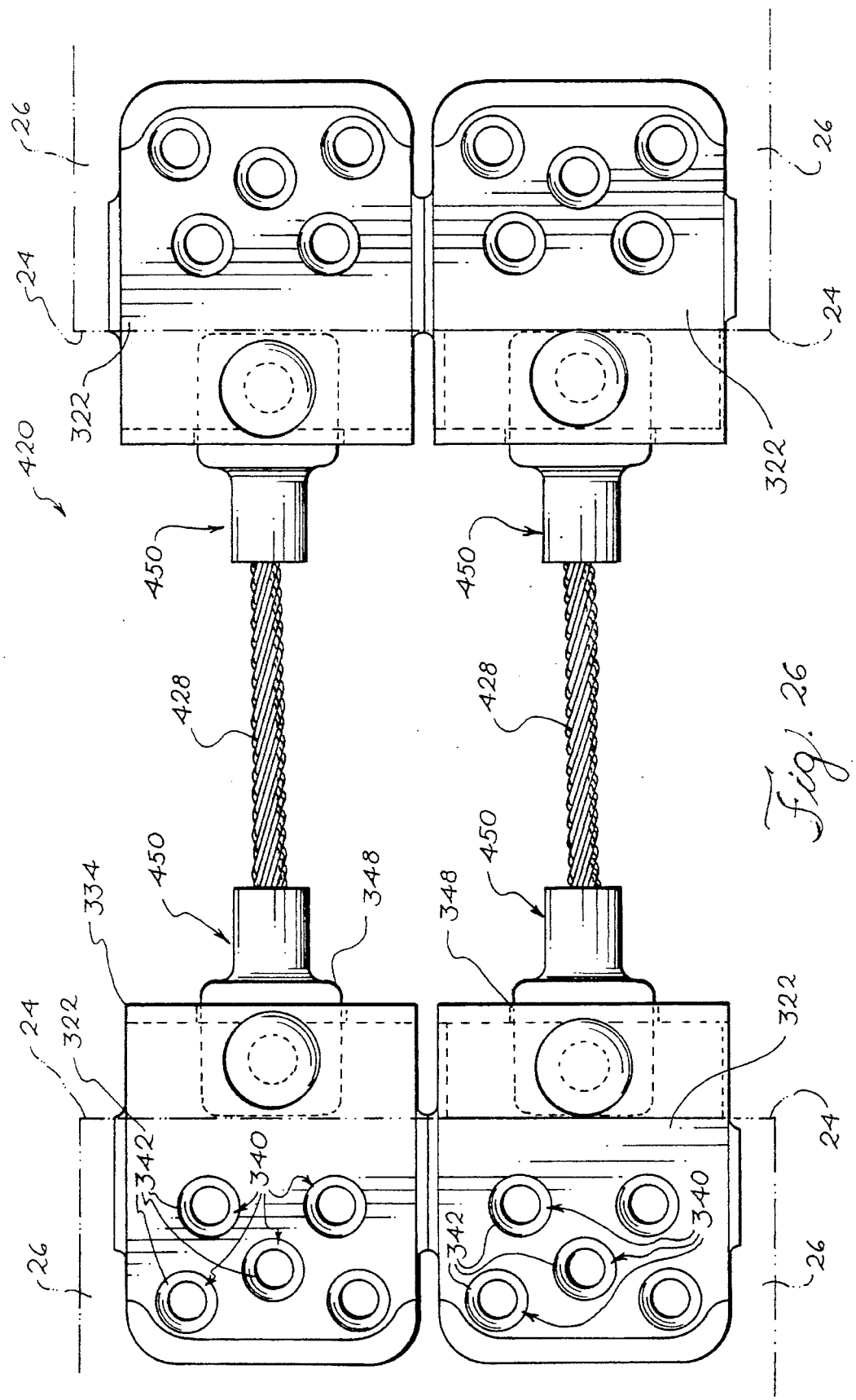
FIG. 26 is a plan view of another splice assembly having cables, embodying various features of the present invention.

Another splice assembly is illustrated in FIG. 26 and referred to generally by reference numeral 420. Splice assembly 420 is the same as splice assembly 320 discussed immediately above, except that in splice assembly 420 the elongated tensile members are cables 428 in place of the straps 328 of splice assembly 320. Splice assembly 420 employs that same belt fasteners 322 as are employed with the splice assembly 320, however the end members 450 differ from the end members 350 of splice assembly 320. In splice assembly 420, end members 450 are attached to either end of cables 428, such as by swaging the end members 450 to the cable 428 or molding the end members 450 to frayed ends of the cable 428. The cables 428 may be encased in a resilient block or slab to further reduce sifting of particulate through the splice.

Still another splice assembly 520 for connecting a pair of belt ends is illustrated in FIGS. 27 and 28. This splice assembly 520 is particularly well suited for applications in which it is desirable to prevent sifting of fine particulate through the splice. Splice assembly 520 is essentially the same as splice assembly 320 of FIGS. 21–25, but differs in the construction and configuration of the elongated tensile members which are in the form of a strap 528. In place of the straps 328 employed in the splice 351, which are of uniform width along their entire length, the splice assembly 520 employs straps 528 having narrow end portions 530 and a wider, integral central portion 532. A representative strap 528 is illustrated in FIG. 28. The narrow end portions 530 of the strap 528 are inserted through the slits 360 in respective end members 350 and then folded back over onto the wider central portion 532 of the strap 528 and the narrow end portions 530 then sewn to the central portion 532. This provides a belt having a width which is the width of the central portion 532, and having a belt fastener 350 affixed to either end, as seen in plan view in FIG. 27.

The wider central portion 532 of the strap 528 allows the sides 533 of adjacent straps 528 to be positioned closely adjacent one another, as illustrated in FIG. 27, to reduce the opening between adjacent straps whereby sifting of particulate through the splice 551 is reduced. The belt engaging portions 352 of the end members 350 are preferably made approximately the same width as the belt fasteners 322, and the central portion 532 of the straps 528 are preferably made slightly wider than the belt engaging portions 352 of the end members 350. With this arrangement, positioning of the belt fasteners 322 adjacent one another along either belt end, and fastening the end members 350 of the splice 551 to respective opposing belt fasteners 322, the edges 533 of the straps 528 of adjacent splices 551 are positioned closely adjacent one another, to reduce the amount of fine particulate passing between the straps 528 of adjacent splices 551.

Finally, still another splice assembly 620 is illustrated in FIG. 30. Splice assembly 620 of FIG. 30 is similar to the splice assembly 320 illustrated in FIGS. 21–25 except that the belt fasteners 622 differ from the belt fasteners 322 of splice assembly 320. That is, the splice 351 discussed above for the splice assembly 320 may be employed with the splice 620 of FIG. 30, with only the belt fasteners 622 being different between splice 620 and splice 320.

As best seen in FIGS. 30 and 31, the belt fasteners 622 of splice assembly 620 have a plurality pairs of apertures 642 in their upper plate 630 with corresponding pairs of apertures 642 in their lower plate 632, for receiving staples 665 therethrough for securing the belt fasteners to the belt 26. A plurality of staples 665 are preferably staked or wedged into respective apertures 642 in the upper plate 630, with the sharp, leading ends 667 of the staples 665 residing adjacent the inner surface 669 of the upper plate 630, as shown in FIG. 31. The leading ends 667 of the staked staples 665 may extend slightly beyond the apertures 642 and reside beneath the inner surface 669, or the leading ends 667 may reside within the apertures 642. The belt fastener 622, with staples 665 staked therein, is placed into position on a belt end 24 and the leading ends 667 of the staples 665 driven through the belt 26 and through the apertures 642 in the lower plate 632, with the ends 667 of the staples 665 then bent over to securely clamp the belt fastener 622 to the belt 26. The belt fastener 622 has a slit 663 for accommodating respective end members 350, as discussed above with regard to splice assembly 320. Alternatively, in applications wherein it is desirable to employ rivets instead of staples, the rivets may be staked into respective apertures in the belt fastener for subsequent driving through the belt. The staking of the rivets or staples reduces the time required to attach belt fasteners to belt ends by eliminating the need for picking up staples or rivets and manually placing them into each of the respective apertures in the belt fasteners. With the rivets or staples staked, the belt fasteners 622 may be placed onto a belt end 24 and the rivets or staples driven to secure the belt fasteners to the belt 26. The upper plate 630 of the belt fastener 622 may have a shallow groove 644 extending between the pairs of apertures 642 to recess the upper ends 671 of the driven staples into the upper plate 630. The upper and lower plates 630 and 632 have respective apertures 662 and 661 for receipt of a rivet or other fastener to connect the belt fastener 622 to the splice 351.

From the foregoing, it will be seen that the present invention allows replacement of the conventional hinge pin between belt fasteners with a plurality of strap or cable splices that connect opposing belt fasteners. The strap or cable splice preferably has a plurality of straps or cables embedded in a plastic body that prevents sifting of conveyed material between the belt fasteners at the splice. See FIG. 32 where straps 328 of the splice 351 of FIGS. 24 and 25 are illustrated as embedded in the slabs having overlapping edges 262*a*–262*d*. The belt or cable splice allows the belt fasteners to pivot relative to one another as do conventional hinged belt fasteners as the splice travels about drums at the ends of the conveyor runs. Preferably, individual belt or cable splices interconnect only opposed pairs of belt fasteners leaving the space between belt fasteners to be bent to form a longitudinal trough in the belt. This also allows replacement of a single splice assembly if it becomes damaged or breaks while leaving the other splice assemblies intact and in place holding the belt ends together. While in the illustrated embodiment of the invention, the strap or cable splice connects only a pair of opposed belt fasteners, the strap or cable splice could have four or more cables to connect several side-by-side belt fasteners on each end of the belt. Also, in the illustrated embodiment of the invention, there is one end member for each strap or cable end and it is possible that two or more strap or cable ends could be connected to a single end member. The illustrated slab serves as a cover to cover and protect the straps or cables embedded therein. The means to cover the straps or cables need not be a slab, and the straps or cables need not be embedded therein.

What is claimed is:

1. In a conveyor belt, the combination comprising:

a belt having first and second ends spliced together into an endless belt;

first belt fasteners secured across the first belt end and being spaced to allow troughing of the belt between the first belt fasteners;

second belt fasteners secured across the second belt end and being spaced to allow troughing of the belt between the second belt fasteners;

a plurality of belt splices each extending between a pair of first and second belt fasteners and interconnecting the belt fasteners to form therewith the splice to form the endless belt; and the belt splices including at least one longitudinally extending, flexible, elongated tensile member connected to the respective first and second belt fasteners for taking the tension loads between the respective belt fasteners and the belt ends;

the belt splices extending in a direction transverse to the longitudinal direction to be closely adjacent other belt splices to reduce the space between adjacent belt splices and the amount of sifting of material from the conveyor belt and through the belt splices.

2. In the conveyor belt of claim 1, the elongated member being a cable.

3. In the conveyor belt of claim 1, the elongated member being a strap.

4. In the conveyor belt of claim 1, the belt splices including covers for at least partially covering the elongated members of the belt splices to protect the elongated members from abrasion or snagging and for reducing the amount of sifting of material through the belt splices.

5. In the conveyor belt of claim 4, the cover comprising a slab substantially covering the length of the elongated members with the opposite ends of the elongated members projecting from the slab; and end members on the respective ends of the elongated members for connection to the respective first and second belt fasteners.

6. In the conveyor belt of claim 1, the first and second belt fasteners having a pair of upper and lower plates with vertically disposed openings in the respective plates, a loop in the belt fasteners connecting the upper and lower plates and having a slot therein through which extends the elongated member, and end members on the elongated members extending horizontally in the first and second belt fasteners and projecting into the openings in the upper and lower plates to transfer loads to and from the belt fastener plates.

7. In the conveyor belt of claim 4, the belt fasteners being made of metal, the slab being a molded plastic body, and the elongated members being straps.

8. In the conveyor belt of claim 3, the elongated members having end members on the respective ends thereof for connection to the respective first and second belt fasteners, the end members being generally flat and having a strap engaging portion positioned outwardly of the belt fasteners, and a belt fastener engaging portion extending into the belt fasteners.

9. In the conveyor belt of claim 5, adjacent slabs having portions overlapping one another to reduce the amount of sifting of material through the belt splice.

10. A splice assembly for connecting together opposing first and second belt ends, the splice assembly comprising:

first belt fasteners for connection to a first belt end;

second belt fasteners for connection to the second belt end; and a plurality of splices for interconnecting a pair of respective first and second belt fasteners;

at least one elongated, flexible tensile member in each splice having opposite ends for connection to their respective first and second belt fasteners for taking the tension load between the respective belt fasteners and belt ends;

the splices extending in a direction transverse to the longitudinal direction to be closely adjacent to one another to reduce the space between adjacent splices and the amount of sifting of material from the conveyor belt and through the splices.

11. A splice assembly in accordance with claim 10 in which said elongated members are cables and the splices include a cover comprising a slab of plastic with the cable embedded therein, and end members fixed to opposite ends of the cables and connected to the respective first and second belt fasteners.

12. A splice assembly in accordance with claim 10 in which the elongated members are straps.

13. A splice assembly in accordance with claim 10 in which the splices include covers for at least partially covering the elongated members of the belt splices to protect the elongated members from abrasion or snagging and for reducing the amount of sifting of material through the belt splices.

14. A splice assembly in accordance with claim 13 in which the cover comprises a slab substantially covering the length of the elongated members with the opposite ends of the elongated members projecting from the slab.

15. A splice assembly in accordance with claim 11 in which the elongated members have end members affixed to their ends for engagement with respective ones of said first and second belt fasteners.

16. A splice for connecting together belt fasteners secured to opposing first and second ends of a belt, the splice comprising:

a body of resilient material having a first end for being positioned adjacent a first belt fastener and a second, opposite end for being positioned adjacent a second, opposing belt fastener;

at least one elongated, flexible tensile member in the body extending across the body between the first and second ends of the body with the tensile member having opposite first and second ends projecting from the respective first and second ends of the body;

a first end member connected to the first end of the tensile member for connection to one of said belt fasteners on the first end of the belt; and a second end member connected to the second end of the tensile member for connection to one of said belt fasteners on the second end of the belt.

17. A splice in accordance with claim 16 in which the elongated tensile member comprises a strap.

18. A splice in accordance with claim 16 in which the elongated tensile member comprises a cable.

19. A belt fastener for use with a cable splice for connecting ends of a belt having upper and lower belt sides, the belt fastener having at least one elongated, flexible tensile member, with an end member attached to the elongated member and having an aperture for receipt of a connecting member, the belt fastener comprising:

an upper plate portion adapted for engagement with the upper side of the belt;

a lower plate portion adapted for engagement with the lower side of the belt;

a loop portion interconnecting said upper and lower plate portions;

said upper and lower plate portions having means for engagement with said belt;

said loop portion having a slot therein through which the elongated member is extendable; and said loop portion further defining a pair of vertically spaced and generally vertically disposed upper and lower apertures spaced from said belt end for receipt of the connecting member through the apertures of the loop portion, with the connecting member being insertable through the aperture of the end member to fasten the end member of the belt splice to the belt fastener.

20. A belt fastener in accordance with claim 19 in which the belt fastener has an insert with an aperture, and the insert is disposable in said loop portion with its aperture in registration with the upper and lower apertures in the loop portion, with the insert acting to guide passage of said connecting member between said upper and lower plate portions.

* * * * *

UNITED STATES PATENT AND TRADEMARK OFFICE
CERTIFICATE OF CORRECTION

PATENT NO. : 5,467,867
DATED : November 21, 1995
INVENTOR(S) : Edward C. Musil, et. al.

It is certified that error appears in the above-indentified patent and that said Letters Patent is hereby corrected as shown below:

Title page, under item [73], Assignee:   insert -- [*] Notice:

The portion of the term of this patent subsequent to May 13, 2013, has been disclaimed.--

Signed and Sealed this

Fourth Day of June, 1996

Attest:

BRUCE LEHMAN

*Attesting Officer*    *Commissioner of Patents and Trademarks*